United States Patent
Bradshaw et al.

(10) Patent No.: US 6,518,211 B1
(45) Date of Patent: Feb. 11, 2003

(54) CHEMICALLY TOUGHENED GLASSES

(75) Inventors: John Michael Bradshaw, Chorley (GB); Ian Heaton Smith, St. Helens (GB); Ashley Carl Torr, Ormskirk (GB); Stanley Lythgoe, Wigan (GB)

(73) Assignee: Pilkington, PLC, Lancashire (GB)

( * ) Notice: Subject to any disclaimer, the term of this patent is extended or adjusted under 35 U.S.C. 154(b) by 0 days.

(21) Appl. No.: 09/646,240

(22) PCT Filed: Mar. 19, 1999

(86) PCT No.: PCT/GB99/00863
§ 371 (c)(1),
(2), (4) Date: Sep. 14, 2000

(87) PCT Pub. No.: WO99/48824
PCT Pub. Date: Sep. 30, 1999

(30) Foreign Application Priority Data

Mar. 20, 1998 (GB) .............................................. 9805863

(51) Int. Cl.⁷ .............................................. C03C 3/085
(52) U.S. Cl. .............................. 501/69; 501/64; 501/70; 501/71; 428/410
(58) Field of Search .............................. 501/64, 69, 70, 501/71, 72; 428/410

(56) References Cited

U.S. PATENT DOCUMENTS

| | | | |
|---|---|---|---|
| 2,901,366 A | * | 8/1959 | Smith et al. |
| 3,364,042 A | * | 1/1968 | Swain et al. |
| 3,524,737 A | | 8/1970 | Doyle et al. |
| 3,772,135 A | | 11/1973 | Hara et al. |
| 3,778,335 A | * | 12/1973 | Boyd |
| 4,055,703 A | | 10/1977 | Rinehart |
| 4,119,760 A | * | 10/1978 | Rinehart ...................... 428/410 |
| 4,156,755 A | | 5/1979 | Rinehart |
| 5,380,685 A | * | 1/1995 | Morimoto et al. ............ 501/71 |
| 5,773,148 A | | 6/1998 | Charrue et al. |
| 5,780,371 A | * | 7/1998 | Rifqi et al. .................... 501/67 |
| 5,804,317 A | | 9/1998 | Charrue |
| 5,895,768 A | | 4/1999 | Speit |
| 6,333,285 B1 | * | 12/2001 | Chopinet et al. ............. 501/69 |

FOREIGN PATENT DOCUMENTS

| | | |
|---|---|---|
| DE | 196 16 633 C | 5/1997 |
| FR | 2 761 978 A | 10/1998 |
| GB | 1 212 123 A | 11/1970 |
| SU | 1 146 288 A | 3/1985 |
| WO | WO 94/08910 A | 4/1994 |

OTHER PUBLICATIONS

Soviet Inventions Illustrated, Section Ch, Week 8541; Derwent Publications Ltd., London, GB; Class H01, AN 85–254649; XP002106746 & SU 1 146 288 A (Glass Res Inst), Mar. 23, 1985; single English language Abstract & document bibliography.

* cited by examiner

*Primary Examiner*—David Sample
(74) *Attorney, Agent, or Firm*—Marshall & Melhorn, LLC

(57) ABSTRACT

A glass composition capable of being chemically strengthened by ion-exchange within 100 hours to provide a glass with a surface compressive stress of greater then 400 MPa and an ion-exchange depth greater then 200 microns comprising: $SiO_2$ 58% to 70% (by weight), $Al_2O_3$ 5% to 15%, $Na_2O$ 12% to 18%, $K_2O$ 0.1% to 5%, MgO 4% to 10%, CaO 0% to 1% with the provisos that the total of the $Al_2O_3$ and MgO is in excess of 13%, the total of the amounts of $Al_2O_3$ plus MgO divided by the amount of $K_2O$ is at least 3 and that the sum of the amounts of $Na_2O$, $K_2O$ and MgO is at least 22%.

12 Claims, No Drawings

CHEMICALLY TOUGHENED GLASSES

BACKGROUND OF THE INVENTION

1. Field of the Invention

The present invention relates to glasses which are capable of being chemically toughened. In particular the present invention relates to glasses which can be chemically toughened and which are primarily, but not essentially, intended for use in aeronautical and automotive vehicles.

In the chemical toughening, of glass, the surface of the glass is compressed by the substitution of alkali ions in the surface layers of the glass by heavier, larger ions. This is customarily effected in an ion-exchange bath containing one or more salts of the heavier ions. By so doing, the breaking strength of the glass is increased, thereby permitting the glass to withstand static stresses, such as those experienced in aircraft cockpits or cabins, and more dynamic stresses, such as those encountered if the aircraft strikes a flock of birds.

2. Description of the Related Art

Chemically strengthenable glasses are well known. Many of these contain significant quantities of lithium. In, for example, U.S. Pat. No. 4,156,755, there is described and claimed such a glass. However, lithium has the disadvantage of increasing the density of the glass and, in many modern applications for chemically toughened glass, this is not acceptable.

German Patent Specification No 19616633C discloses a wide range of glass compositions, some of which overlap the ranges of the present invention. However, the manner in which they are produced is not revealed. These glasses are used for making display panels and security glazing. However, such glasses essentially contain fluorine and cannot, therefore, be made by the float process. Similarly, Russian Patent Specification No 1146288A also discloses glass compositions which overlap some of the ranges of the composition of the present invention. However, these are not made by the float process and, as it is well known by those skilled in the art, there is a very large difference between float (or flat) glass and container glass of the type described in such Patent Specification.

An alternative method of chemically toughening glass if the glass contains sodium ions is to ion-exchange these for potassium ions. Such a method is disclosed in, for example, International (PCT) Patent Application No. WO 94/108910. Such glass has the added advantage that it has a low density of approximately 2.46 in comparison with conventional float glass which has a density of approximately 2.50. Although such patent alleges that no boron need be present in the glass, it is clear that the glass would be more difficult to melt if boron was absent. In fact, this is borne out by the sole example in the patent which discloses a composition containing nearly 3.5% $B_2O_3$. Boron oxide lowers the viscosity of the glass. This makes the glass easier to melt and, in theory, easier to refine. Moreover, the combination of, in the context of these glasses, high amounts of both boron and potassium allows the low density to be achieved. However, the use of boron is disadvantageous in that it attacks the silica crowns conventionally used in furnaces.

The use of high quantities of potassium also has drawbacks. In particular, large amounts of potassium cause the production of high viscosity foams early in the melting process. These are very slow to collapse and often lead to silica faults in the finished glass which makes it unacceptable from a commercial viewpoint.

It is desirable if the glasses produced have relatively high strain points so that the ion-exchange can be effected at higher temperatures and the desired level of chemical toughening can be achieved in an economically acceptable time. It is known that the strain point can be raised by increasing the quantities of alumina or zirconia in the glasses. However, these materials are extremely refractory and are difficult to melt in a conventional float furnace within an acceptable time. Alkali metal oxides, such as those of lithium, sodium and potassium help to digest alumina and zirconia but have an adverse effect on the strain point and prevent a high surface compressive stress being achieved during the ion-exchange.

Alkaline earth metal oxides have also been utilised in making glasses which are chemically toughened by ion-exchange. However, these also have drawbacks associated therewith. Zinc oxide is not compatible with the float process, due to the ease with which it is reduced to zinc metal, thereby producing an unacceptable bloom on the glass. Calcium oxide interferes with the sodium/potassium ion-exchange and leads to poor penetration whilst magnesium oxide, particularly in the presence of alumina, normally raises the liquidus temperature of the glass to an unacceptably high level. It will be understood that glasses being manufactured on a float plant should have a positive working range, that is to say, a positive difference between the temperature at which the glass has a viscosity of 10,000 poise and the liquidus, also known as the crystallisation, temperature.

OBJECT OF THE INVENTION

The present invention therefore seeks to provide boron-free glasses having a positive working range, which can be readily melted to float glass standards with respect to the inclusion of bubble and solids and which can be chemically strengthened over a period of less than 100 hours to exhibit a surface stress of at least 400 MPa with a depth of ion penetration greater than 200 microns.

In a subsidiary aspect, the present invention also seeks to provide a glass having a low density. In particular, a low density, in the context of the present invention, is less than 2.48 $g/cm^3$, preferably less than 2.46 $g/cm^3$. This is particularly true if the glass is intended for use in aeronautical applications. Throughout this specification, the amounts of components are given in weight percent unless specifically stated otherwise.

SUMMARY OF THE INVENTION

According to the present invention, there is therefore provided a boron-free float glass composition having a positive working range comprising:

| | |
|---|---|
| $SiO_2$ | 58% to 70% (by weight) |
| $Al_2O_3$ | 5% to 15% |
| $Na_2O$ | 12% to 18% |
| $K_2O$ | 0.1% to 5% |
| MgO | 4% to 10% |
| CaO | 0% to 1% | with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

We have surprisingly found that the amount of $Al_2O_3$ is critical. If the amount of $Al_2O_3$ is less than 5%, insufficient stress can be created when the glass is toughened by ion-exchange but if it is greater than 15%, the glass becomes extremely difficult to melt and causes liquidus problems.

MgO has been found to be a highly desirable component of the glasses of the present invention. It assists in lowering the melting temperature whilst simultaneously not affecting the strain point of the glass. Furthermore, it helps to increase the surface stress of the glass during the ion-exchange process.

Both MgO and $Al_2O_3$ help to achieve the high surface compressive stress required if the glass is to be used in aeronautical applications. However, when both are present in comparatively high amounts, as in the glasses of the present invention, they can have an adverse effect on the liquidus temperature of the glass.

$K_2O$ poses many problems when melting glass in a float tank. For example, during the melting process, it causes foaming which breaks up into a scum and eventually appears in the finished glass as an inclusion fault. Nevertheless, in the context of the present invention, it is essential to assist in the diffusion of additional potassium ions from the ion-exchange bath so as to achieve sufficiently deep penetration at a reasonable rate. We have surprisingly found that if the amounts of $Al_2O_3$, MgO and $K_2O$ are as outlined above, the above-mentioned problems do not arise or are at least minimised.

CaO is often used to lower the melting point of glasses. However, its presence in glasses of the present invention lead to low ion penetration during the ion exchange. It is, therefore, not specifically included in the glasses of the present invention but some CaO may be present as an impurity such as, for example, if the glasses of the present invention are being made in a non-dedicated furnace and CaO was present in the composition previously made in that furnace.

In preferred embodiments of the present invention, other constituents may be present in the composition. For example, iron oxide, which gives glasses containing it a green coloration can be used. If used, the iron will be present in both its ferrous and ferric forms. Ferric iron absorbs radiation in the ultraviolet portion of the electromagnetic spectrum whilst ferrous iron absorbs in the infra-red portion. If iron is to be used, the amount thereof and the ratio of ferrous to ferric iron will be selected in dependence, usually, upon the intended use of the glass. Since iron reduces the visible light transmission of the glass, this is clearly undesirable in aeronautical applications and in communication and detection systems which operate using infra-red beams. In such circumstances, therefore, the amount of iron present is maintained low, that is to say, below 0.2%, preferably below 0.05%. Similarly, the amount of ferrous iron present is maintained as low as possible, that is to say, below 20% and ideally below 15% of the total iron present.

On the other hand, if the glass is intended for use in surface vehicles, the absorption of infra-red radiation and ultraviolet radiation are desirable. In such a case, therefore, the amount of iron present may be as much as 2% or higher and the ferrous level may be as high as 40%. To remove the green coloration, other additives such as cobalt, selenium and/or nickel may be included in the composition. If it is desired to improve the ultraviolet absorption of the glass, additives such as cerium or titanium may be included in the composition.

Float glasses are conventionally refined using sulphate, generally identified as $SO_3$, and carbon. However, the usual amounts of these materials added to the composition of the present invention causes excessive foaming. We have found that the glass may be readily refined if the amount of $SO_3$ present in the batch is limited to 0.1% to 0.4%.

The potassium salt used for the ion-exchange may be any suitable salt such as the sulphate, the chloride or mixtures thereof. However, for their general ease of use and for their melting range the nitrates are preferred. The ion-exchange medium may be formed into a paste with an inert medium such as oxides of iron, titanium or silicon as is well known in the art. As is also known per se, the ion-exchange may be accelerated, if desired, by the application of an electric field to the process.

Polished samples of the glasses were strengthened by ion-exchange in a chemical bath containing 99.5% $KNO_3$ and 0.5% silicic acid at temperatures ranging from 400° C. to 460° C. for periods of from 25 hours to 240 hours. Temperatures of below 400° C. may be used but, if a large ion-exchange bath is being employed, there is the possibility of the temperature in localised regions dropping below the melting point of the potassium nitrate. Similarly, temperatures of over 500° C. may be employed but, at this temperature level, the potassium nitrate begins to decompose which can have deleterious effects on the quality of the glass and may also release noxious fumes. Following immersion, the glasses were allowed to drain for 30 minutes and were then cooled in air to ambient temperature. Residual salt was washed from the glass and the surface stress and the depth of the compressive layer were measured using a Differential Stress Refractometer. The data was modified to take into account changes in the refractive index of the composition and of the stress optical coefficient. Birefringence was related to applied stress, the comparison being made with a conventional soda-lime-silica glass as made by the float process. The data obtained were combined to predict how long the ion-exchange treatment would need to be continued at a selected temperature to achieve a pre-determined surface stress and compressive depth. Compositions having the desired predicted properties were then prepared as samples for strength testing, were treated for the predicted length of time and were then strength tested to destruction.

The invention will be further described, by way of example, with reference to the following non-limitative Examples:

TABLE

| Glass No. | wt % | | | | | | | | | | | | |
|---|---|---|---|---|---|---|---|---|---|---|---|---|---|
| | $SiO_2$ | $B_2O_3$ | $Al_2O_3$ | $Na_2O$ | $K_2O$ | MgO | CaO | $TiO_2$ | $ZrO_2$ | $P_2O_5$ | $CeO_2$ | $Fe_2O_3$ | $SO_3$ |
| 1 | 62.30 | 0.00 | 8.80 | 15.80 | 4.90 | 7.80 | 0.20 | 0.00 | 0.00 | 0.00 | 0.00 | 0.02 | 0.20 |
| 2 | 64.70 | 0.00 | 6.50 | 15.00 | 4.50 | 8.90 | 0.20 | 0.00 | 0.00 | 0.00 | 0.00 | 0.02 | 0.20 |
| 3 | 65.80 | 0.00 | 5.50 | 14.10 | 4.50 | 9.50 | 0.20 | 0.00 | 0.00 | 0.00 | 0.20 | 0.02 | 0.22 |
| 4 | 66.20 | 0.00 | 6.50 | 14,70 | 4.30 | 7.90 | 0.20 | 0.00 | 0.00 | 0.00 | 0.00 | 0.02 | 0.20 |
| 5 | 63.40 | 0.00 | 8.80 | 15.30 | 3.90 | 8.20 | 0.20 | 0.00 | 0.00 | 0.00 | 0.00 | 0.02 | 0.20 |

TABLE-continued

| | | | | | | | | | | | | | |
|---|---|---|---|---|---|---|---|---|---|---|---|---|---|
| 6 | 64.49 | 0.00 | 9.20 | 15.30 | 3.90 | 6.30 | 0.50 | 0.00 | 0.00 | 0.00 | 0.00 | 0.02 | 0.31 |
| 7 | 61.50 | 0.00 | 13.10 | 15.00 | 3.90 | 5.90 | 0.50 | 0.00 | 0.00 | 0.00 | 0.00 | 0.02 | 0.10 |
| 8 | 64.60 | 0.00 | 10.00 | 15.20 | 3.90 | 5.30 | 0.90 | 0.00 | 0.00 | 0.00 | 0.00 | 0.02 | 0.10 |
| 9 | 63.60 | 0.00 | 11.00 | 15.80 | 3.60 | 5.20 | 0.50 | 0.00 | 0.00 | 0.00 | 0.00 | 0.02 | 0.31 |
| 10 | 64.50 | 0.00 | 10.10 | 15.60 | 3.60 | 6.00 | 0.00 | 0.00 | 0.00 | 0.00 | 0.00 | 0.02 | 0.20 |
| 11 | 61.70 | 0.00 | 14.10 | 16.00 | 3.50 | 4.50 | 0.00 | 0.00 | 0.00 | 0.00 | 0.00 | 0.02 | 0.20 |
| 12 | 65.50 | 0.00 | 8.80 | 15.30 | 3.20 | 6.80 | 0.20 | 0.00 | 0.00 | 0.00 | 0.00 | 0.02 | 0.19 |
| 13 | 63.40 | 0.00 | 8.80 | 16.00 | 3.20 | 8.20 | 0.20 | 0.00 | 0.00 | 0.00 | 0.00 | 0.02 | 0.20 |
| 14 | 65.00 | 0.00 | 10.10 | 16.00 | 2.50 | 6.20 | 0.00 | 0.00 | 0.00 | 0.00 | 0.00 | 0.02 | 0.17 |
| 15 | 65.00 | 0.00 | 10.30 | 16.40 | 2.00 | 6.10 | 0.00 | 0.00 | 0.00 | 0.00 | 0.00 | 0.02 | 0.16 |
| 16 | 64.80 | 0.00 | 11.00 | 17.60 | 0.60 | 5.80 | 0.00 | 0.00 | 0.00 | 0.00 | 0.00 | 0.02 | 0.20 |
| 17 | 65.80 | 0.00 | 10.60 | 17.40 | 0.00 | 5.60 | 0.40 | 0.00 | 0.00 | 0.00 | 0.00 | 0.02 | 0.17 |
| 18 | 63.10 | 0.00 | 10.90 | 15.60 | 3.60 | 5.10 | 0.50 | 0.00 | 0.00 | 0.00 | 0.00 | 1.00 | 0.20 |
| 19 | 62.40 | 0.00 | 10.80 | 15.50 | 3.50 | 5.10 | 0.50 | 0.00 | 0.00 | 0.00 | 0.00 | 2.00 | 0.20 |
| 20 | 61.20 | 0.00 | 10.60 | 15.20 | 3.50 | 5.00 | 0.50 | 0.00 | 0.00 | 0.00 | 0.00 | 3.80 | 0.20 |
| 21 | 63.10 | 0.00 | 10.90 | 15.60 | 3.60 | 5.10 | 0.50 | 1.00 | 0.00 | 0.00 | 0.00 | 0.02 | 0.20 |
| 22 | 63.10 | 0.00 | 10.90 | 15.60 | 3.60 | 5.10 | 0.50 | 0.00 | 1.00 | 0.00 | 0.00 | 0.02 | 0.20 |
| 23 | 63.10 | 0.00 | 10.90 | 15.60 | 3.60 | 5.10 | 0.50 | 0.00 | 0.00 | 1.00 | 0.00 | 0.02 | 0.20 |
| 24 | 54.00 | 0.00 | 17.50 | 20.20 | 0.60 | 7.50 | 0.00 | 0.00 | 0.00 | 0.00 | 0.00 | 0.02 | 0.20 |
| 25 | 68.50 | 0.00 | 6.30 | 14.70 | 3.60 | 6.50 | 0.20 | 0.00 | 0.00 | 0.00 | 0.00 | 0.02 | 0.20 |
| 26 | 71.10 | 0.00 | 3.00 | 14.20 | 3.60 | 7.70 | 0.20 | 0.00 | 0.00 | 0.00 | 0.00 | 0.02 | 0.20 |
| 27 | 66.20 | 3.40 | 4.80 | 11.90 | 6.10 | 7.10 | 0.30 | 0.00 | 0.00 | 0.00 | 0.00 | 0.08 | 0.10 |
| 28 | 72.70 | 0.00 | 1.10 | 13.00 | 0.60 | 3.90 | 8.30 | 0.05 | 0.00 | 0.00 | 0.00 | 0.11 | 0.25 |

| Glass No. | $Fe^2$ | $(Al_2O_3 + MgO)$ | $(Al_2O_3 + MgO)/K_2O$ | Time taken to achieve 400 MPa surface stress and 200 microns compressive depth (hours) | Temperature required to achieve 400 MPa surface stress and 200 microns compressive depth (°C.) | Surface stress (MPa) achieved at 430° C. after 81 hours |
|---|---|---|---|---|---|---|
| 1 | 18 | 16.6 | 3.4 | 66 to 71 | 437 to 438 | 420 |
| 2 | 19 | 15.4 | 3.4 | 101 to 102 | 434 | 444 |
| 3 | 10 | 15.0 | 3.3 | 16 to 31 | 471 | 515 |
| 4 | 19 | 14.4 | 3.3 | 72 to 74 | 438 to 439 | 439 |
| 5 | 19 | 17.0 | 4.4 | 19 to 31 | 462 to 470 | 512 |
| 6 | 16 | 15.5 | 4.0 | 42 to 61 | 445 to 455 | 434 |
| 7 | 19 | 19.0 | 4.9 | 11 to 13 | 504 to 507 | 670 |
| 8 | 20 | 15.3 | 3.9 | 48 to 57 | 439 to 443 | 409 |
| 9 | 17 | 16.2 | 4.5 | 48 to 58 | 437 to 441 | 407 |
| 10 | 18 | 16.1 | 4.5 | 35 to 39 | 446 to 448 | 441 |
| 11 | 18 | 18.6 | 5.3 | 2 to 12 | 493 to 464 | 477 |
| 12 | 17 | 15.6 | 4.9 | 35 to 37 | 455 to 456 | 454 |
| 13 | 18 | 17.0 | 5.3 | 84 to 94 | 443 to 444 | 505 |
| 14 | 19 | 16.3 | 6.5 | 97 to 105 | 423 to 425 | 396 |
| 15 | 18 | 16.4 | 8.2 | 32 to 61 | 442 to 459 | 435 |
| 16 | 19 | 16.8 | 28.0 | 81 to 108 | 427 to 433 | 414 |
| 17 | — | 16.2 | — | 114 to 121 | 424 to 426 | 408 |
| 18 | 36 | 16.0 | 4.4 | 16 to 19 | 473 to 477 | 474 |
| 19 | 23 | 15.9 | 4.5 | 20 to 21 | 475 | 563 |
| 20 | 22 | 15.6 | 4.5 | 39 to 48 | 457 to 459 | 577 |
| 21 | 18 | 16.0 | 4.4 | 41 to 64 | 440 to 453 | 426 |
| 22 | 17 | 16.0 | 4.4 | 17 to 22 | 465 to 470 | 513 |
| 23 | — | 16.0 | 4.4 | 45 to 52 | 438 to 441 | 383 |
| 24 | — | 25.0 | 41.7 | 10 to 11 | 500 to 510* | 442 |
| 25 | — | 12.8 | 3.6 | 147 to 149 | 407 to 408 | 364 |
| 26 | — | 10.7 | 3.0 | 898 to 1332 | 351 to 357 | 342 |
| 27 | — | 11.9 | 2.0 | 84 to 88 | 450 to 451 | 496 |
| 28 | — | 5.0 | 8.3 | 3896 to 4337 | 400 to 401 | 462 |

| | Property | | | | | | |
|---|---|---|---|---|---|---|---|
| Glass No. | Temp. at $10^{2.5}$ poise (° C.) | Temp. at $10^{4.0}$ poise (° C.) | Annealing point (° C.) | Strain point (° C.) | T (Liquidus) (° C.) | Density (g cm$^3$) | Thermal expansion coefficient (100–300° C. (×$10^{-7}$/° C.) |
| 1 | 1362 | 1067 | — | — | 920 | 2.480 | — |
| 2 | 1362 | 1068 | — | — | 970 | 2.469 | — |
| 3 | 1364 | 1072 | 572 | 539 | 1056 | 2.468 | 103.8 |
| 4 | 1388 | 1081 | — | — | 920 | 2.463 | — |
| 5 | 1382 | 1085 | — | — | 1070 | 2.475 | — |
| 6 | 1431 | 1112 | 553 | 513 | 950 | 2.457 | — |
| 7 | 1478 | 1157 | 583 | 545 | 1006 | 2.463 | 100.5 |
| 8 | 1438 | 1112 | 549 | 511 | 912 | 2.458 | 102.5 |
| 9 | 1427 | 1103 | 560 | 524 | 939 | 2.560 | 106.0 |
| 10 | 1432 | 1110 | 571 | 534 | — | 2.456 | — |
| 11 | — | — | 585 | 546 | — | 2.457 | 105.6 |
| 12 | 1422 | 1098 | 567 | 531 | 925 | 2.455 | 100.5 |
| 13 | 1374 | 1078 | — | — | 1043 | 2.472 | — |
| 14 | 1436 | 1114 | 579 | 541 | — | 2.455 | — |
| 15 | 1438 | 1106 | 579 | 544 | 903 | 2.454 | — |

TABLE-continued

| | | | | | | | |
|---|---|---|---|---|---|---|---|
| 16 | 1437 | 1119 | — | — | — | 2.453 | 99.5 |
| 17 | 1442 | 1125 | 587 | 553 | — | 2.454 | — |
| 18 | 1432 | 1116 | 563 | 526 | — | 2.469 | — |
| 19 | 1427 | 1111 | — | — | 909 | 2.476 | — |
| 20 | 1413 | 1106 | 565 | 527 | 948 | 2.495 | — |
| 21 | 1422 | 1105 | — | — | — | 2.470 | — |
| 22 | — | — | — | — | — | 2.476 | — |
| 23 | 1439 | 1110 | 569 | 534 | 960 | 2.457 | 104.0 |
| 24 | 1368 | 1092 | 613 | 577 | 1150 | 2.504 | 108.5 |
| 25 | 1418 | 1101 | — | — | — | 2.442 | — |
| 26 | 1393 | 1080 | — | — | — | 2.436 | — |
| 27 | 1346 | 1043 | 548 | 513 | — | 2.456 | 98.5 |
| 28 | 1335 | 1035 | 554 | 523 | 1000 | 2.502 | 89.5 |

Note * denotes temperature restricted to 510° C. as salt would decompose at higher temperatures In the Examples given above, Examples 1 to 16 inclusive show basic compositions in accordance with the present invention. In Examples 18 and 19, the effect of adding iron oxide ($Fe_2O_3$) is shown. In Example 20, the iron content has been raised to 3.8% and it can be seen that the chemical strengthening properties have not been impaired but the density of the glass has increased. Examples 21 and 22 show that the addition of 1% by weight of, respectively $TiO_2$ and $ZrO_2$ do not adversely affect the chemical strengthening properties but, like high quantities of iron, do increase the density of the glass. Example 23 includes phosphorus and although it can be seen that the chemical strengthening properties are not affected, phosphorus has high corrosive effects on the refractories of the furnace. Example 24 shows that a higher content of $Na_2O$ and $Al_2O_3$ substantially increase the density of the glass and mean that it has a negative working range. This Example is, therefore, a comparative Example.

Examples 17,25,26,27 and 28 are further comparative Examples. Example 25 shows that if the aluminium oxide plus magnesium oxide content is lower than 13%, the time required to strengthen the glass to a desired depth is substantially increased. Example 26 shows that the same problem is encountered if the aluminium oxide content is less than 5%. Example 17 shows that the presence of less than 0.1% potassium oxide permits the desired chemical strengthening to be achieved but, again, the time taken to achieve this is long.

Example 27 is a commercial ion-exchange glass containing boron which, as aforementioned, is not used in the present invention due to the necessity of providing a dedicated furnace with boron resistant refractory materials. Finally, Example 28 is a standard window float glass.

What is claimed is:

1. A boron-free float glass having a density which is less than 2.48 g/cm$^3$ and a composition capable of being chemically strengthened over a period of less than 100 hours to exhibit a surface stress of at least 400 Mpa with a depth of ion penetration greater than 200 microns comprising:

| | |
|---|---|
| $SiO_2$ | 58% to 70% (by weight) |
| $Al_2O_3$ | 5% to 15% |
| $Na_2O$ | 12% to 18% |

-continued

| | |
|---|---|
| $K_2O$ | 0.1% to 5% |
| MgO | 4% to 10% |
| CaO | 0% to 1% | with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

2. A composition as claimed in claim 1 additionally containing $Fe_2O_3$ in an amount of from 0.2% to 4% by weight, the ferrous state being at least 20%.

3. A composition as claimed in claim 1 additionally containing $Fe_2O_3$ in an amount of less than 0.2% by weight.

4. A composition as claimed in claim 3 additionally including cerium oxide in an amount of from 0.05% to 0.5% by weight.

5. A composition as claimed in claim 3 wherein the ferrous state is less than 20%.

6. A composition as claimed in claim 1 additionally containing $TiO_2$ in an amount of up to 1% by weight.

7. A composition as claimed in claim 1 additionally containing sulphate in an amount of from 0.1% to 0.4% by weight.

8. A composition as claimed in claim 2 additionally including a colorant for neturalising the green colour produced by the $Fe_2O_3$.

9. A composition as claimed in claim 8 wherein the colorant is selected from cobalt oxide, nickel oxide or selenium or mixtures thereof.

10. A composition as claimed in claim 1 in which the $Al_2O_3$ is present in an amount in excess of 6% by weight and the MgO is present in an amount of from 4% to 8% by weight.

11. A composition as claimed in claim 1 in which the MgO is present in an amount in excess of 8% by weight and the $Al_2O_3$ is present in an amount of from 5% to 9% by weight.

12. A composition as claimed in claim 1 in which the $K_2O$ is present in an amount of from 0.5% to 3.5% by weight and the $Al_2O_3$ is present in an amount of from 5.5% to 11% by weight.

* * * * *